United States Patent [19]
Wisniewski

[11] 3,780,763
[45] Dec. 25, 1973

[54] PULSE RATIO MODULATION VALVE

[75] Inventor: Raymond B. Wisniewski, Huntsville, Ala.

[73] Assignee: The United States of America as represented by the Secretary of the Army, Washington, D.C.

[22] Filed: June 2, 1971

[21] Appl. No.: 149,345

Related U.S. Application Data

[63] Continuation-in-part of Ser. No. 859,504, Sept. 19, 1969, abandoned.

[52] U.S. Cl. .................. 137/599, 251/43, 251/30
[51] Int. Cl. ......................................... F16k 31/363
[58] Field of Search .................... 251/29, 30, 43; 137/599

[56] References Cited
UNITED STATES PATENTS

| | | |
|---|---|---|
| 2,676,779 | 4/1954 | Boden et al. .......................... 251/29 |
| 2,758,811 | 8/1956 | Peterson ................................ 251/29 |
| 2,937,846 | 5/1960 | Hannant et al. ....................... 251/29 |
| 3,125,319 | 3/1964 | Arbogast et al. ...................... 251/29 |

Primary Examiner—Arnold Rosenthal
Attorney—Harry M. Saragovitz et al.

[57] ABSTRACT

A valve disposed for use in a rocket having thrust vector control means for attitude control of the rocket. The valve is operated by a normally-open two-way solenoid cartridge which controls a spring actuated disk valve for venting pressurized fluid from behind the valve pintle. The normally-open solenoid provides fluid control pressure for pintle closing and prevents valve pintle vibration during rocket engine vibration. In response to closing of the solenoid, the control pressure behind the pintle is vented and fluid supply pressure displaces the pintle from blocking an exit port in the valve body to provide fluid pressure flow therethrough.

3 Claims, 9 Drawing Figures

PATENTED DEC 25 1973 3,780,763

Raymond B. Wisniewski,
INVENTOR

Harry M. Saragovitz
BY Edward J. Kelly
Herbert Berl
Harold W. Hilton

PULSE RATIO MODULATION VALVE

CROSS REFERENCE TO RELATED APPLICATION

This application is a continuation-in-part of copending application Ser. No. 859,504 filed Sept. 19, 1969 and now abandoned.

BACKGROUND OF THE INVENTION

It is well recognized that effective thrust vector control of rockets or missiles can be achieved by injecting a secondary fluid into an exhaust gas of a rocket motor. The resulting interaction between the injected fluid and the primary exhaust gas flow creates a shock wave which causes the primary exhaust gas flow to deflect.

The pulse ratio modulation valve of the present invention provides for simple on-off thrust vector control by converting missile gyro output into a train of pulses. The valve achieves proportional control by adjusting the on and off times of the pulses.

SUMMARY OF THE INVENTION

The pulse ratio modulation valve of the present invention provides thrust vector control of a missile by injecting a fluid into the exhaust stream of a rocket for deflection thereof. The device utilizes a two-way normally-open solenoid to maintain a control fluid pressure behind the valve pintle to close the exit port in the valve body. The valve pintle is provided with a disk valve at one end thereof and with a venting passage therethrough which vents the fluid control pressure from an inner surface of the pintle to allow the pintle to be displaced from blocking the exit port, by a fluid supply pressure which acts on the outer surface of the pintle. The supply fluid pressure is then ejected from the valve body and directed into the main rocket exhaust stream.

DESCRIPTION OF THE PREFERRED EMBODIMENT

Figure 1:
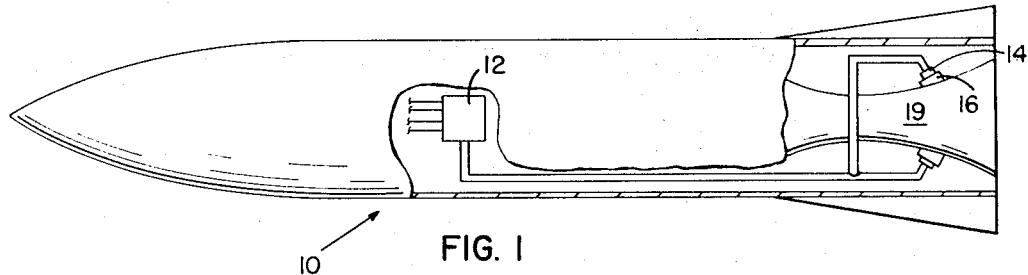
FIG. 1 is a diagrammatic view of a rocket utilizing the valve of the present invention.

As seen in FIG. 1 a missile 10 includes an attitude control mechanism 12, commonly known in the art, which includes a gyro to provide signals to a solenoid 14 mounted on a plurality of valves 16 for actuation of the valves. The valves are mounted about the periphery of the rocket motor 19 for thrust vector control thereof, in a manner well known in the art.

Figure 2:
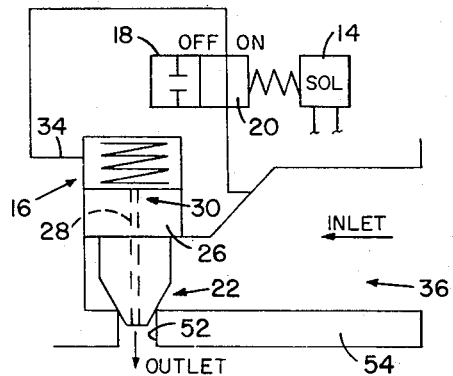
FIG. 2 is a schematic view of the valve of the present invention.
Figure 3:
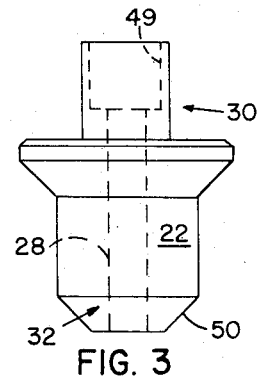
FIG. 3 is an elevational view of the valve pintle.

As seen in FIG. 2 the valve assembly includes normally-open two-way solenoid 14 having on and off positions 20 and 18 respectively. A pintle 22 is slidably mounted in body 24 of the valve and includes an annular shoulder 26 thereon. A passage 28 is provided through pintle 22 and opens to the outside thereof at the ends 30 and 32 of the pintle.

Ports 34 and 36 are provided in body 24 of the valve and are disposed in communication with a source of control fluid pressure and a source of supply fluid pressure (not shown). The control fluid pressure and supply fluid pressure is received from a single source and is directed into a chamber having lower and upper portions 33 and 35, respectively. The control fluid pressure is directed through ports 34 into upper chamber portion 35 behind the pintle. The supply fluid pressure is directed into lower chamber portion 33 through port 36.

Figure 8:
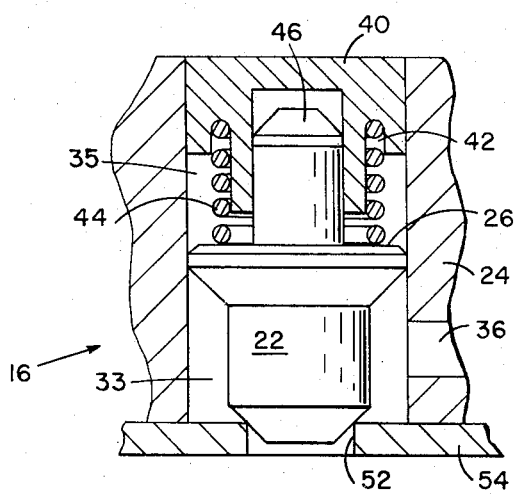
FIG. 8 is a partial sectional view showing the pintle guide and spring.

The upper end 30 of the pintle is slidably mounted in a pintle guide member 40 (FIG. 8) having an annular recessed portion 42 into which one end of a spring 44 is mounted. The outer end of spring 44 is mounted on shoulder 26 of the pintle.

A disk valve 46 is secured in biased relation by a spring 48 mounted inside an opening 49 in end 30 of the pintle. Disk valve 46 is carried above the passage 28 provided in the pintle.

Figure 9:
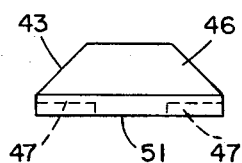
FIG. 9 is an elevational view of the disk valve used in the valve mechanism of the present invention.

Disk valve 46 (FIG. 9) is provided with spaced grooves 47 on the underside thereof so that fluid pressure in upper chamber portion 35 is allowed to slowly leak through passage 28 even when the valve 46 is in seated engagement with the upper seat 45 of the pintle. However, force exerted by spring 44 and fluid pressure in upper chamber 35 combine to retain surface 50 of the pintle 22 in seated relation with exit port 52 to prevent fluid pressure in chamber 33 from escaping through the exit port 52.

Lower end 32 of the pintle is tapered at 50 for mating engagement with an exit port 52 provided in a pintle seat 54 and secured to the valve body.

Figure 4:
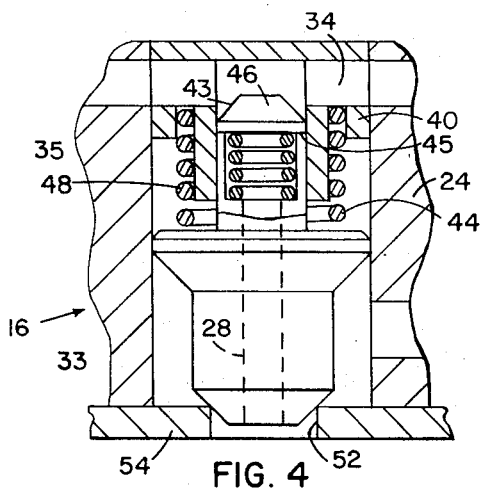
FIGS. 4–7 are diagrammatic views illustrating various positions of the valve mechanism during operation thereof.

In its normally-open position, the solenoid allows fluid control pressure in upper chamber portion 35 behind the pintle to retain the pintle in engagement with the pintle seat 52 to prevent flow from the chamber portion 35 through the exit port 52. As shown in FIG. 4, in this position, fluid control pressure is directed into chamber portion 35 from ports 34 and holds the disk valve 46 closed against the pintle vent orifice while holding the pintle closed against the exit port 52.

Figure 5:
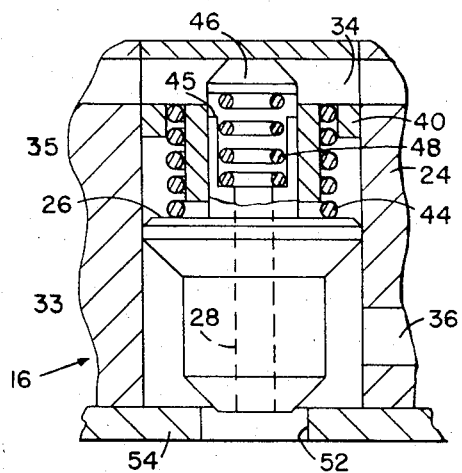

As shown in FIG. 5, when the solenoid cartridge is switched to its closed position, the force exerted upward against disk valve 46 by spring 48 combines with the lowered pressure in chamber 35, due to pressure leakage through grooves 47 of disk valve 46, to raise disk valve 46 off the seat 45 of the pintle. Fluid pressure in chamber 33 moves the pintle upward so that pintle surface 50 is disengaged from exit port 52 and fluid pressure in chamber 33 is directed out the exit port 50.

Figure 6:
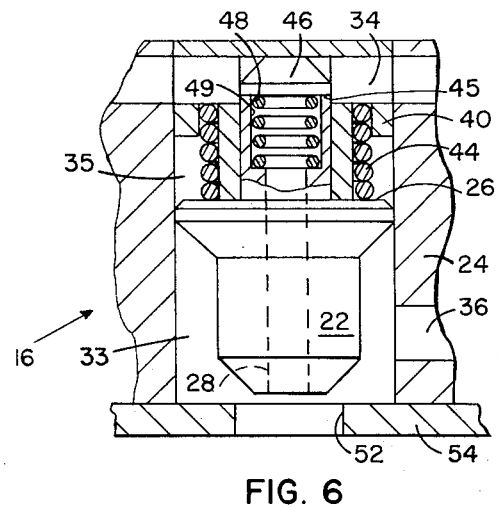

FIG. 6 illustrates the position of the valve components in the full open condition. The fluid opening pressure, i.e., pressure in chamber portion 33 pushes the pintle full open and the venting process ceases with the engagement of the disk valve 46 against the pintle vent orifice.

Figure 7:
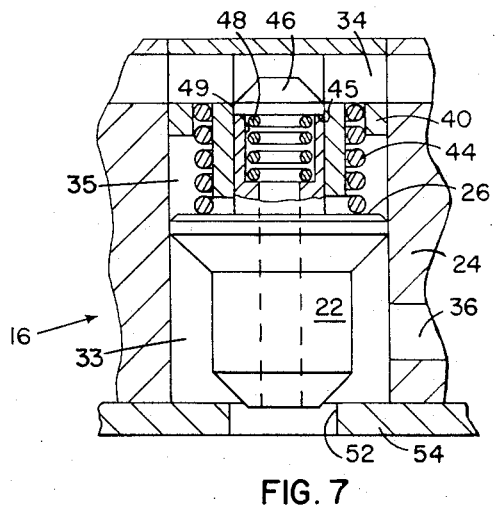

Disk valve 46 (FIG. 9) is provided with a back surface 43 having a larger area than the front surface 51 thereof. Thus, when the solenoid cartridge is again switched to its "on" position the control fluid pressure, i.e., pressure admitted through ports 34 acts on surface 43 to force the disk valve downward against seat 45 of the pintle to close the vent passage 28. Additional fluid pressure through ports 34 forces pintle 22 downward so that seat 50 of the pintle engages exit port 52 to close the exit port (FIG. 7) and prevent additional fluid from leaving chamber portion 33. The pintle spring 44 aids the pintle in overcoming closing friction forces and holds the pintle closed when the valve is not pressurized.

I claim:

1. A plurality of pulse ratio modulation valves for use in a rocket attitude control system and adapted to inject fluid pressure against exhaust gases directed out of the nozzle of said rocket for diverting the flow direction of said exhaust gases wherein each valve comprises:
   a. a body having a chamber including upper and lower portions, a first plurality of inlets disposed in communication with said upper chamber portion and a second plurality of inlets disposed in communication with said lower chamber portion for directing said fluid therein, and an exit port disposed in communication with said lower chamber portion for directing said fluid from said body;
   b. a pintle slidably mounted in biased relation in said body, said pintle including an upper portion disposed in said upper chamber portion, said pintle further including a lower portion disposed in said lower chamber portion and having a seating surface thereon for seating engagement with said exit port, said pintle disposed for displacement from a first position of engagement with said exit port to a second position of disengagement from said exit port;
   c. venting means including a passage extending through said upper and lower portions of said pintle, said passage having one end opening through said seating surface and the second end thereof communicating into said upper chamber portion, and a cap member disposed in biased relation atop said first upper portion of said pintle to retain said fluid pressure from said first inlet ports in said upper chamber portion;
   d. solenoid valve means disposed in normally-open position for directing fluid pressure from said second plurality of inlets into said upper chamber portion respectively, said solenoid valve means disposed for activation for displacement of said cap member from said first upper portion of said pintle for venting fluid pressure from said upper chamber portion through said passage and out of said body, whereby said fluid pressure disposed in said lower chamber portion displaces said pintle to said second position and fluid from said second plurality of inlets is directed through said exit port to said rocket exhaust stream; and,
   e. biasing means for biasing said pintle in said closed position when said solenoid is in said open position.

2. A valve as set forth in claim 1 including guide means carried in said upper chamber portion in surrounding relation with said upper portion of said pintle.

3. A valve as set forth in claim 2 including a first spring disposed in biased relation between said pintle and said guide means and a second spring disposed in biased relation between said pintle and said cap member.

* * * * *